US009171379B2

(12) United States Patent
Mack et al.

(10) Patent No.: US 9,171,379 B2
(45) Date of Patent: *Oct. 27, 2015

(54) HYBRID PRECISION TRACKING

(71) Applicant: Lightcraft Technology, LLC, Venice, CA (US)

(72) Inventors: Newton Eliot Mack, Venice, CA (US); Philip R. Mass, Portland, OR (US)

(73) Assignee: Lightcraft Technology LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/370,948

(22) PCT Filed: Apr. 10, 2013

(86) PCT No.: PCT/US2013/036005
§ 371 (c)(1),
(2) Date: Jul. 7, 2014

(87) PCT Pub. No.: WO2013/155203
PCT Pub. Date: Oct. 17, 2013

(65) Prior Publication Data
US 2015/0016680 A1    Jan. 15, 2015

Related U.S. Application Data

(60) Provisional application No. 61/624,145, filed on Apr. 13, 2012, provisional application No. 61/785,517, filed on Mar. 14, 2013.

(51) Int. Cl.
*G06K 9/00* (2006.01)
*G06T 7/20* (2006.01)
(Continued)

(52) U.S. Cl.
CPC ............... *G06T 7/204* (2013.01); *G01C 11/04* (2013.01); *G01S 3/7864* (2013.01); *G06T 7/002* (2013.01); *G06T 7/0085* (2013.01); *G06T 15/80* (2013.01); *G06T 19/006* (2013.01); (Continued)

(58) Field of Classification Search
None
See application file for complete search history.

(56) References Cited

U.S. PATENT DOCUMENTS 5,175,616 A * 12/1992 Milgram et al. ................ 348/47
5,729,471 A * 3/1998 Jain et al. ...................... 725/131
(Continued)

FOREIGN PATENT DOCUMENTS

WO    WO 97/00494       1/1997
WO    WO 2013/082539 A1   6/2013

OTHER PUBLICATIONS

International Search Report and Written Opinion for Serial No. PCT/US2013/036005 mailed Oct. 1, 2013.
(Continued)

*Primary Examiner* — Randolph I Chu
(74) *Attorney, Agent, or Firm* — Brooks Acordia IP Law, P.C.; Douglas N. Larson

(57) ABSTRACT

Disclosed herein are through-the-lens tracking systems and methods which can enable sub-pixel accurate camera tracking suitable for real-time set extensions. That is, the through-the-lens tracking can make an existing lower precision camera tracking and compositing system into a real-time VFX system capable of sub-pixel accurate real-time camera tracking. With this enhanced level of tracking accuracy the virtual cameras can be used to register and render real-time set extensions for both interior and exterior locations.

31 Claims, 8 Drawing Sheets

(51) Int. Cl.

| | |
|---|---|
| *G06T 19/00* | (2011.01) |
| *G01C 11/04* | (2006.01) |
| *G01S 3/786* | (2006.01) |
| *G06T 7/00* | (2006.01) |
| *G06T 15/80* | (2011.01) |

(52) U.S. Cl.
CPC ............... *G06T 2207/10012* (2013.01); *G06T 2207/10024* (2013.01); *G06T 2207/20221* (2013.01); *G06T 2207/30204* (2013.01); *G06T 2207/30244* (2013.01); *G06T 2219/2008* (2013.01)

(56) References Cited

U.S. PATENT DOCUMENTS

| | | | |
|---|---|---|---|
| 5,949,433 A * | 9/1999 | Klotz | 345/634 |
| 6,014,163 A | 1/2000 | Houskeeper | |
| 6,064,749 A | 5/2000 | Hirota et al. | |
| 7,307,655 B1 * | 12/2007 | Okamoto et al. | 348/222.1 |
| 7,965,904 B2 * | 6/2011 | Kobayashi | 382/292 |
| 2003/0202120 A1 | 10/2003 | Mack | |
| 2004/0104935 A1 | 6/2004 | Williamson et al. | |
| 2005/0015005 A1 * | 1/2005 | Kockro | 600/427 |
| 2006/0165310 A1 | 7/2006 | Mack | |
| 2006/0258938 A1 | 11/2006 | Hoffman et al. | |
| 2006/0281971 A1 * | 12/2006 | Sauer et al. | 600/109 |
| 2007/0248283 A1 | 10/2007 | Mack et al. | |
| 2008/0075385 A1 | 3/2008 | David et al. | |
| 2008/0145812 A1 * | 6/2008 | Taub et al. | 433/3 |
| 2008/0228434 A1 * | 9/2008 | Aratani et al. | 702/150 |
| 2008/0252746 A1 | 10/2008 | Mack | |
| 2009/0096875 A1 * | 4/2009 | Yoshimaru et al. | 348/207.1 |
| 2009/0262217 A1 | 10/2009 | Mack et al. | |
| 2010/0119114 A1 * | 5/2010 | Ardis et al. | 382/106 |
| 2010/0164862 A1 | 7/2010 | Sullivan et al. | |
| 2010/0245593 A1 | 9/2010 | Kim et al. | |
| 2011/0026014 A1 | 2/2011 | Mack et al. | |
| 2011/0085025 A1 * | 4/2011 | Pace et al. | 348/49 |
| 2011/0221742 A1 | 9/2011 | Deering et al. | |
| 2013/0148851 A1 * | 6/2013 | Leung et al. | 382/103 |
| 2013/0215229 A1 * | 8/2013 | Yerli | 348/46 |
| 2013/0251199 A1 * | 9/2013 | Raghoebardayal | 382/103 |
| 2014/0147103 A1 * | 5/2014 | Zellan et al. | 396/50 |

OTHER PUBLICATIONS

International Preliminary Report on Patentability for Serial No. PCT/US2013/036005 mailed Jun. 24, 2014.
Previzon product brochure entitled "PREVIZION Real Time Camera Trackong on Set Visualization Real Time VFX", published on Apr. 8, 2011.
Mack, Eliot, "VFX by the Numbers: A Technical Introduction to Previzion", Jun. 20, 2011, Lightcraft Technology.
Foxlin, Eric & Naimark, Leonid,"VIS-Tracker:A Wearable Vision-Inertial Self-Tracker", InterSense, Inc., IEEE VR2003, Mar. 22-26, Los Angeles,CA.
Diard, Franck,"Chapter 41, Using the Geometry Shader for Compact and Variable-Length GPU Feedback", Downloaded from the Internet on Jul. 2, 2014, from <URL:http://http.developer.nvidia.com/GPUGems3/gpugems3_ch41.html>.

* cited by examiner

HYBRID PRECISION TRACKING

CROSS-REFERENCE TO RELATED APPLICATIONS

This application claims the benefit of co-pending provisional application Ser. No. 61/624,145, filed Apr. 13, 2012, and whose entire contents are hereby incorporated by reference, and of co-pending provisional application Ser. No. 61/785,517, filed Mar. 14, 2013, and whose entire contents are hereby incorporated by reference.

TECHNICAL FIELD

This application relates to systems and methods for combining real scene elements from a video, film, digital type camera or the like with virtual scene elements from a virtual camera into a finished composite image, and more particularly, to systems and methods for creating matching virtual scene elements with live action scene elements to a high degree of precision.

BACKGROUND

Combining real world imagery with additional imagery from another source requires careful control over which sections of each image are to be used in the final composite image. One common application is to combine images generated by a computer with images acquired from a traditional motion picture, video or digital camera. In order to seamlessly combine the images, the camera parameters from the point of view of the virtual scene camera must be closely matched to the parameters of the live action camera. In addition, for use in on set and live applications, the match between virtual and live action sceneries must be completed quickly, preferably in a matter of milliseconds in order to be useful at standard motion picture and television production frame rates of 24 to 30 frames per second.

Tracking the live action camera and lens may be achieved in a variety of ways. (See U.S. patent application Ser. No. 12/832,480, filed Jul. 8, 2010, entitled "Methods and Systems for Calibrating an Adjustable Lens," which was published on Feb. 3, 2011 as Publication No. 20110026014, and which issued as U.S. Pat. No. 8,310,663 ('663) and whose entire contents are hereby incorporated by reference.) The measurement of the live action camera's position and orientation may be achieved with optical encoders, by solving the pose of fiducial markers located overhead or in the scene, with inertial accelerometers, by matching high contrast points from one image to the next, and many other methods common in the field.

Real-time measuring methods that measure the angular tilt of the camera (pan, tilt and roll) at the camera itself share a common problem. Small errors in angular measurement become large positional errors when projected out several feet, which is where the majority of live action and virtual scenery seams are located. This can be seen clearly in a composited image as a shifting or sliding between the virtual and live action elements when the camera is moved.

A traditional method of solving this high precision seam is to use post-production software tools, such as Syntheyes, 3D Equalizer, Boujou, PF Track, or Nuke that locate and track multiple high contrast regions from one frame to the next. By analyzing the relative motion of several points on the screen, the live action camera motion and lens parameters can be derived and the motion of the virtual background matched cleanly to the live action foreground.

This process has several limitations. Firstly, if an actor walks in front of the high contrast area being tracked, the camera solution mathematics can easily be disrupted. Secondly, the process of measuring the motion by tracking the individual pixels of the high contrast part of the image is both fragile and time-consuming. It typically cannot be computed in real time, and if a frame of the live action image has a lighting change where the pattern is unrecognizable, the artist must re-specify the high contrast area at the frame of failure to continue the process. In fact, the process of solving an accurate camera track from an arbitrary moving background can exceed the time required to complete the rest of the shot due to the handwork required.

In addition, if the live action camera is zoomed in, the high contrast area that was being tracked can simply disappear from the image, resulting in the camera failing to track the object. It is notoriously difficult for the algorithms used to derive camera intrinsic parameters from shots where the camera is simultaneously changing its focal length ("zooming in") and translating.

Accordingly, the pure pixel tracking based methods do not work well for the demands of real-time visual effects processing, which must be very rapid to compute as well as robust to the frame-by-frame changes in the live action video image and changes in the adjustment of the cinema lens being used to record the image.

A prior art system is the PREVIZION system, which is available from Lightcraft Technology, LLC. of Venice, Calif. The PREVIZION system includes a camera tracking system, a lens calibration system, a real-time compositing system, and a built-in 3D renderer. An example of a publication disclosing the prior art PREVIZION system is the PREVIZION product brochure, entitled "Previzion Specifications 2011," published on Apr. 8, 2011, and whose contents are incorporated by reference.

SUMMARY

Various embodiments of a hybrid precision tracking system are disclosed herein. In one embodiment, an artist surveys the 3D center position of artificial high contrast marker points that are placed on the stage where virtual scenery will join with live action. The artist then enters the position of these points into a computer system. The artist selects points from the live action image that correlate with the 3D positions of the centers of the high contrast marker points that were measured in the live action scene. These points can be selected using a 2D display of the live action image, for example by locating a pointer in the desired location over the visible marker, and pressing a selection button.

The live action camera and lens connected to the computer system are being tracked by a camera and lens tracking system, so that the live action camera and lens parameters are closely known. The computer can then predict where on the 2D screen the 3D surveyed points should be, and display a virtual marker there.

The above process generates a list of points with a known 3D position, a predicted 2D screen position of these points, and an actual 2D screen position. The process of minimizing the error between the predicted 2D screen position of the 3D surveyed points and the actual 2D screen position of the 3D surveyed points can create a high precision tracking solution.

Since the 2D-to-3D correlation can be created by clicking on a live action object, the 2D representation is viewed from the position of the current live action camera. For the 3D surveyed point to line up accurately, it can be projected from a virtual camera with the same position, orientation and lens parameters as the live action camera. The virtual camera can be calibrated to the live action camera using a camera and lens calibration system as described in the above-mentioned '633 patent.

For high accuracy, the system quickly detects the optical center of the scene marker. In one aspect of the disclosure, the marker is a circular dot. The detection of the dot can be achieved by a series of operations that are optimized on the GPU. In one embodiment, this set of operations can include: edge or slope detection; removal of parallel lines to select for circular markers; searching along the normal of the current slope for the opposite side of the circle, and thereby determining a candidate for the center point of that circle; voting for the most likely center point, using the accumulation of all of the centerlines; and readout of the highest weighted point to the CPU with a fast data transfer, such as a geometry shader.

After this is done, the delta between the predicted point XY screen location and the actual XY screen location can be minimized, by performing a least squares or similar error minimizing solution on the pan, tilt and roll rotary axes of the camera to provide a delta angle to the incoming angular data.

As searching the entire screen for markers is costly computationally, the system can predict the XY projected marker location using its list of marker XYZ positions, and only search in a pattern around the position of the marker, taking into account all camera and lens parameters, such as lens field of view and distortion.

Since the optical solution of the centers of the circles may vary from frame to frame, causing a visible "jitter" in the virtual to live action seam, this delta angle in turn can be filtered to remove the "jitter" by a Kalman or other low pass filter to create a smooth motion while retaining accuracy.

When an object is removed from view, the remaining delta angle is also filtered to avoid jitter. Even if all of the markers are excluded, the delta angle between the incoming camera tracking data and the minimized solution is preserved, so that when the markers appear on the other side of the actor they can be re-acquired with minimal visual artifacts. The concentration on filtering the delta angle of the solution means that the visual solve is robust to individual marker occlusion.

In traditional optical tracking systems, the XY position of the markers drives the focal length of the solve, and slight marker instability can cause errors in focal length calculation. With a hybrid approach of the present disclosure, the calculation of the lens focal length can be done earlier and stored, and the marker motion can be rapidly stabilized in the XY space without losing lens focal length accuracy.

The separation of the two components (the external sensor based camera and lens tracking, and pixel based delta angle calculation) makes a real-time use of this system possible. In addition, the hybrid approach can easily handle zooming and high distortion lenses.

According to another aspect of the disclosure, the 3D locations of the markers can also be entered using 3D survey data.

According to a further aspect of the disclosure, the XYZ position of the markers can be solved by translating the camera and shooting two or more images of the dots from separate points of view, then using a photogrammetry solution to solve for the XYZ positions of the markers. This enables use of the system without an external survey tool.

According to a still further aspect of the disclosure, the system can use naturally occurring features, such as the SIFT or SURF algorithms.

According to a yet still further aspect of the disclosure, the system can scan the entire screen.

According to another aspect of the disclosure, the computations required to perform subpixel matching can be performed in real time.

According to a further aspect of the disclosure, the hybrid precision tracking can automatically handle variations in lens focal length or distortion.

According to a still further aspect of the disclosure, the marker data can be entered in standard 3D survey coordinate form and rapidly modified by the artist during production.

According to another aspect a hybrid precision tracking method can be achieved with data that is already existing in a real-time compositing and camera tracking system.

According to a further aspect a Hough transform or other related transform can be used to identify the circle centers.

According to a still further aspect the system can use active markers to generate small dots of light that can be seen identically from most orientations.

According to a still further aspect the system can use an artificial bar code or fiducial type marker that can be rapidly identified by standard machine vision techniques.

According to a yet further aspect the current camera motion data from the camera tracking system can be used to generate a "deblurred" image of the marker. (This can be important in order to handle tracking with any degree of camera motion.)

Disclosed herein is a through-the-lens tracking system/method which when in a PREVIZION system (or method) enables sub-pixel accurate camera tracking suitable for real-time set extensions. That is, the through-the-lens tracking incorporated into a PREVIZION system makes the system a real-time VFX system capable of sub-pixel accurate real-time camera tracking. With this enhanced level of tracking accuracy the virtual cameras can be used to register and render real-time set extensions for both interior and exterior locations.

A through-the-lens tracking system of the present disclosure can be integrated with existing PREVIZION camera tracking tools to provide additional sub-pixel accurate tracking information for any shot especially where optical tracking or encoded cranes cannot provide a suitable level of accuracy to be used in final composites. The PREVIZION system automatically follows pre-measured tracking markers that are visible through the main camera lens (whether mounted directly on the set or a green screen) and merges that data with the standard optical/inertial or encoded crane tracking information.

In the past, precise registration of virtual elements and real world settings was achieved by doing expensive and time-consuming post-optical tracking. This time consuming process is transformed herein by removing the need to use post-production optical trackers like Syntheyes or 3D Equalizer, saving hours of processing time per shot. With the new combination of tracking techniques, PREVIZION users can achieve sub-pixel accurate tracking in real time and can do complicated set extensions with the same ease and cost effective techniques that are currently being achieved with PREVIZION. That is, the human eye can detect a wobble of a pixel; thus, the present system has a registration with the precision to generally produce tracking accuracy within a fraction of a pixel, e.g., "sub-pixel" accuracy.

Additional tools verify tracking accuracy and register the through-the-lens information with a locally surveyed coordinate framework. These tools can take into account complex calculations involving image recognition and analysis to track multiple targets visible in the main camera viewfinder. All of this processing can happen within a tight time frame to maintain the real-time capability of the PREVIZION system.

More specifically, video is typically shot at frame rates of anywhere from 24 to 60 frames per second. Since the system also has to do the other keying, tracking, rendering and compositing tasks on the same GPU, the circular detection and solution can be done within just a few milliseconds. In fact, the algorithm of the system can be quick enough to predict and detect a circle in less than two milliseconds.

According to an embodiment herein a hybrid through-the-lens tracking system is disclosed. The system can include a first system and a second system operatively connected thereto. The first system can include a calibrated look-up table and can be configured to use the calibrated look-up table to modify search locations for scene markers when using adjustable lenses (such as for motion picture and television visual effects production). The first system can be configured to transmit predicted 2D locations of the scene markers to the second system, wherein the second system is configured to use a high speed GPU-based scene marker detection scheme that uses a fast geometry based search to calculate the predicted 2D locations of the centers of the scene markers. The high speed detection can be under 10 milliseconds per marker, or between 2 and 10 milliseconds per marker. The scene markers can be circular markers, fiducial markers, bar code markers or natural feature markers.

Also disclosed herein is a hybrid through-the-lens tracking method that includes subjecting surveyed live action scene marker locations, live action images and combined camera and lens data to a hybrid precision tracking process to produce filtered camera pose data. The hybrid precision tracking process can include: using the incoming live camera and lens data to predict the 2D position of the locations of on screen markers; searching within an area around the predicted 2D position for markers; calculating the actual XY position of the markers; and modifying the camera pose data to align the predicted positions with the actual positions. The process can further include filtering the resulting angular changes to remove noise from the process.

A method of hybrid through-the-lens tracking is disclosed. This method can include: reading the current incoming camera and lens information; using the lens position information to look up the current lens parameters; using the stored lens parameters and camera information to predict the location of 2D markers in the scene; detecting the positions of the actual 2D markers in the scene; and calculating the necessary angular corrections from the incoming camera position data to best correct the camera's angular position to match the actual 2D markers. And the information can include the current measured camera position and orientation, and the lens parameters include focal length, distortion and entry pupil location.

According to another aspect a hybrid through-the lens tracking method is disclosed. The method can include: using a calibrated look-up table of a first system to modify search locations for scene markers when using adjustable lenses (such as for motion picture and television visual effects production); transmitting, using the first system, predicted 2D locations of the scene markers to a second system; and using the first system and the predicted 2D locations to minimize the reprojection error between the estimated positions and the actual detected positions of the scene markers.

A hybrid precision tracking method is disclosed which includes calculating a filtered pose using predicted camera location data, 3D location data of surveyed tracking markers and a live action image. This method can further include sending the filtered pose to a 3D renderer to generate a correctly aligned rendered 3D image. The calculating step can include: measuring the camera's position and orientation; measuring the adjustment position of the camera lens; looking up the optical parameters of the lens, based on the measured adjustment lens positions; predicting the on-screen XY position of surveyed physical locations in the scene, using the camera and lens information; searching in an area surrounding the predicted XY position for a detectable marker that represents the actual position of the physical location; measuring the difference in camera angular movement required to minimize the error between the predicted and actual physical XY location. And the calculating step can further include filtering the angular difference value over time to remove any angular noise introduced by the measuring steps.

A method of finding the center of a circle is also disclosed. The method can include: detecting the edge or slope of an image luminance or color, and storing this information in a derivative image; removing parallel lines from the resulting derivative image by searching along the normal of the current derivative slope to select for circular markers; searching along the direction of the current slope for the opposite side of the circle, and thereby determining a candidate for the center point of the circle; voting for the most likely center point, using the accumulation of all of the center points; and reading out the highest weighted point to a CPU with a fast data transfer.

BRIEF DESCRIPTION OF THE DRAWINGS

The foregoing and other features and advantages of the present disclosure will be more fully understood from the following detailed description of illustrative embodiments, taken in conjunction with the accompanying drawings.

DETAILED DESCRIPTION

The following is a detailed description of the presently known best mode(s) of carrying out the inventions. This description is not to be taken in a limiting sense, but is made merely for the purpose of illustrating the general principles of the inventions.

A rapid, efficient and reliable system for generating a rapid and precise camera and lens match that significantly speeds the integration of live action and virtual composite images is disclosed. Applications ranging from video games to feature films can implement the system in a fraction of the time typically spent tracking multiple areas of high contrast in the image by hand. The system thereby can greatly reduce the cost and complexity of matching virtual and live action backgrounds, and enables a much wider usage of the virtual production method.

Since the present process is primarily for joining live action with computer-generated elements, its applications for video games may be limited. The process works with a real-time video feed from a camera, which is also available on most "still" cameras. The process can work with a "video tap" mounted on a film camera, in systems where the image is converted to a standard video format that can be processed. An objective of the present disclosure is to provide a method and apparatus for creating rapid high precision measurement of camera rotation.

Figure 1:
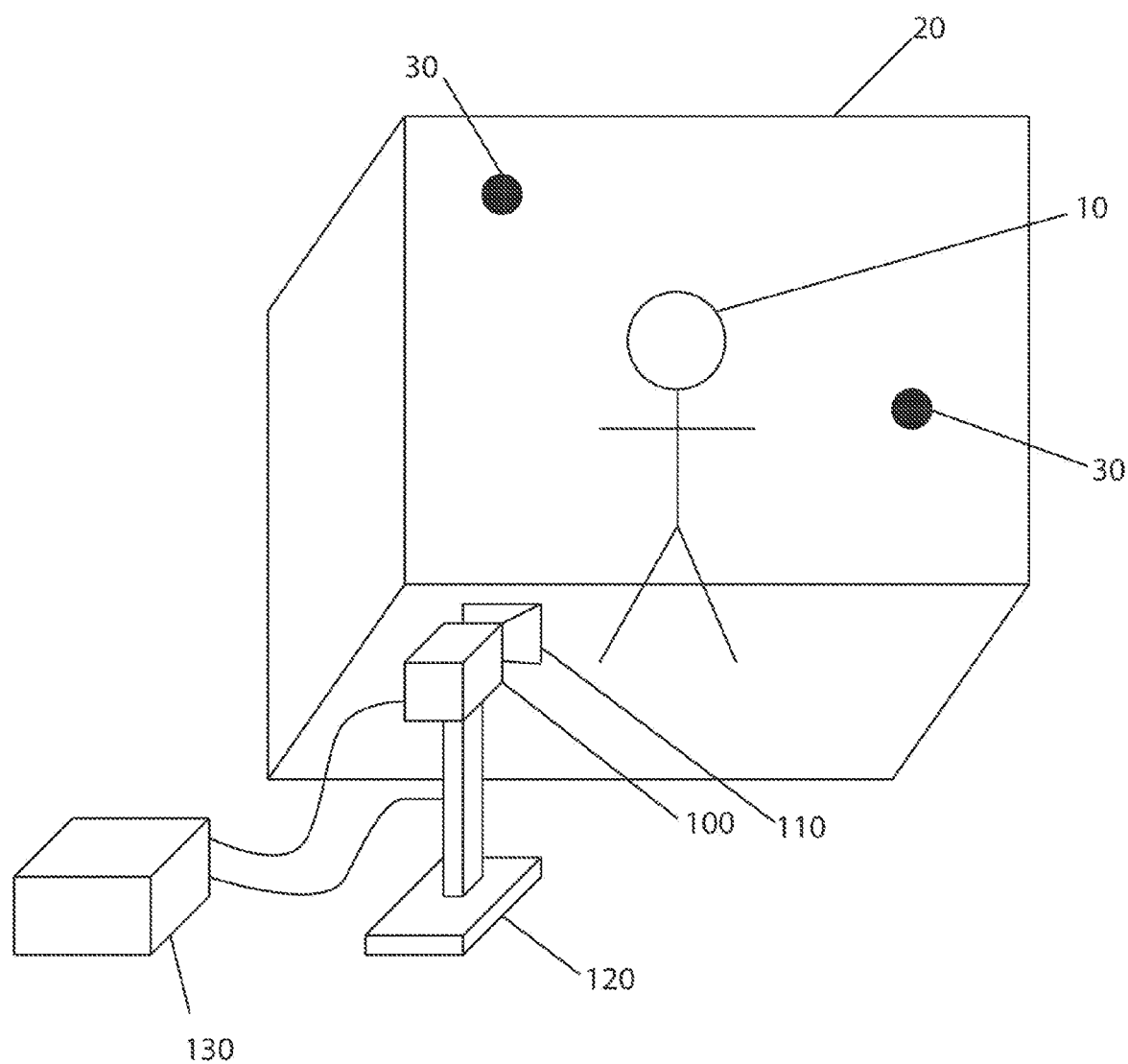
FIG. 1 is a perspective view of an embodiment in accordance with the present disclosure.

Referring to FIG. 1, an embodiment of the present disclosure is depicted. A scene camera 100 with a lens 110 is positioned to capture a live action image 90 (FIG. 2) of a subject 10 in front of a background 20. The subject(s) 10, for example, can be actors, props and physical sets. The background 20 can have markers 30 that are placed in known positions in the scene. Per an aspect of the disclosure, the centers of the markers 30 can be measured accurately in 3D space using a survey tool, and used to increase the accuracy of the camera solve.

The scene camera 100 can be mounted on a camera tracking system 120. And the camera tracking system 120 can be an encoded pedestal, dolly, jib, crane or any other form of camera position, orientation and field-of-view measuring system. Focus distance can also be measured, as the parameters of a lens can change while focusing. There may be more than one scene camera to enable different views of the subject's performance to be captured.

Figure 7:
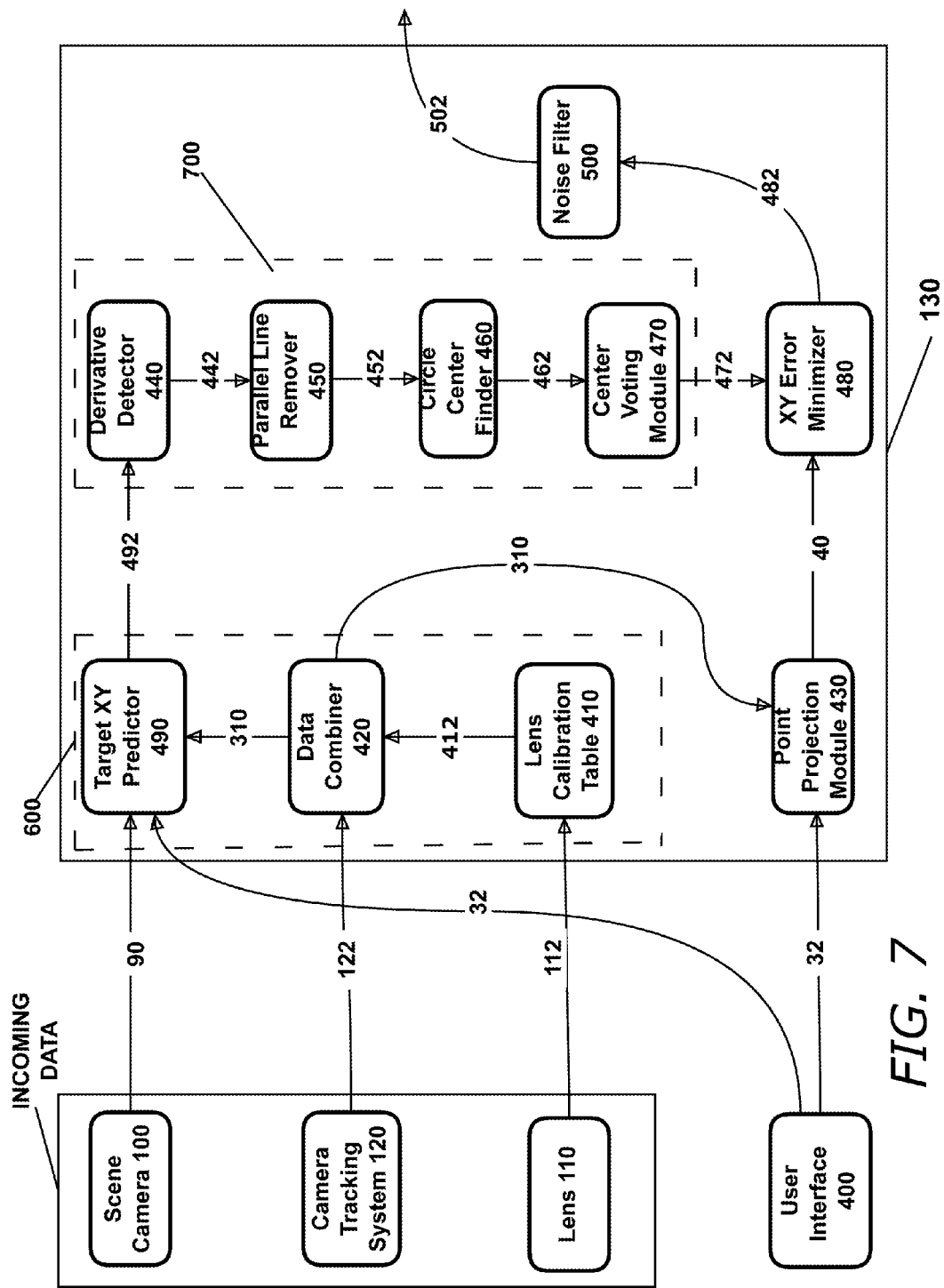
FIG. 7 is a data flow diagram in accordance with the present disclosure.

The scene camera 100 and the camera tracking system 120 are connected to a video processing system 130, as depicted in FIG. 7. The video processing system 130 takes the incoming live action video image 90, recognizes the live action markers 30, generates the corresponding background virtual marker XY locations of markers 40 (FIG. 2) and performs a delta angle minimization process using the two sets of XY data. The video processing system 130 can include a computer with a live video input, a camera tracking data input, and a video card capable of processing 2D and 3D computer graphics calculations.

The hardware components of the video processing system 130 can typically include a computer, a video input and output board that converts high definition serial digital video into the computer's memory, and a graphics card or GPU where the circle detection algorithms are run.

Figure 2:
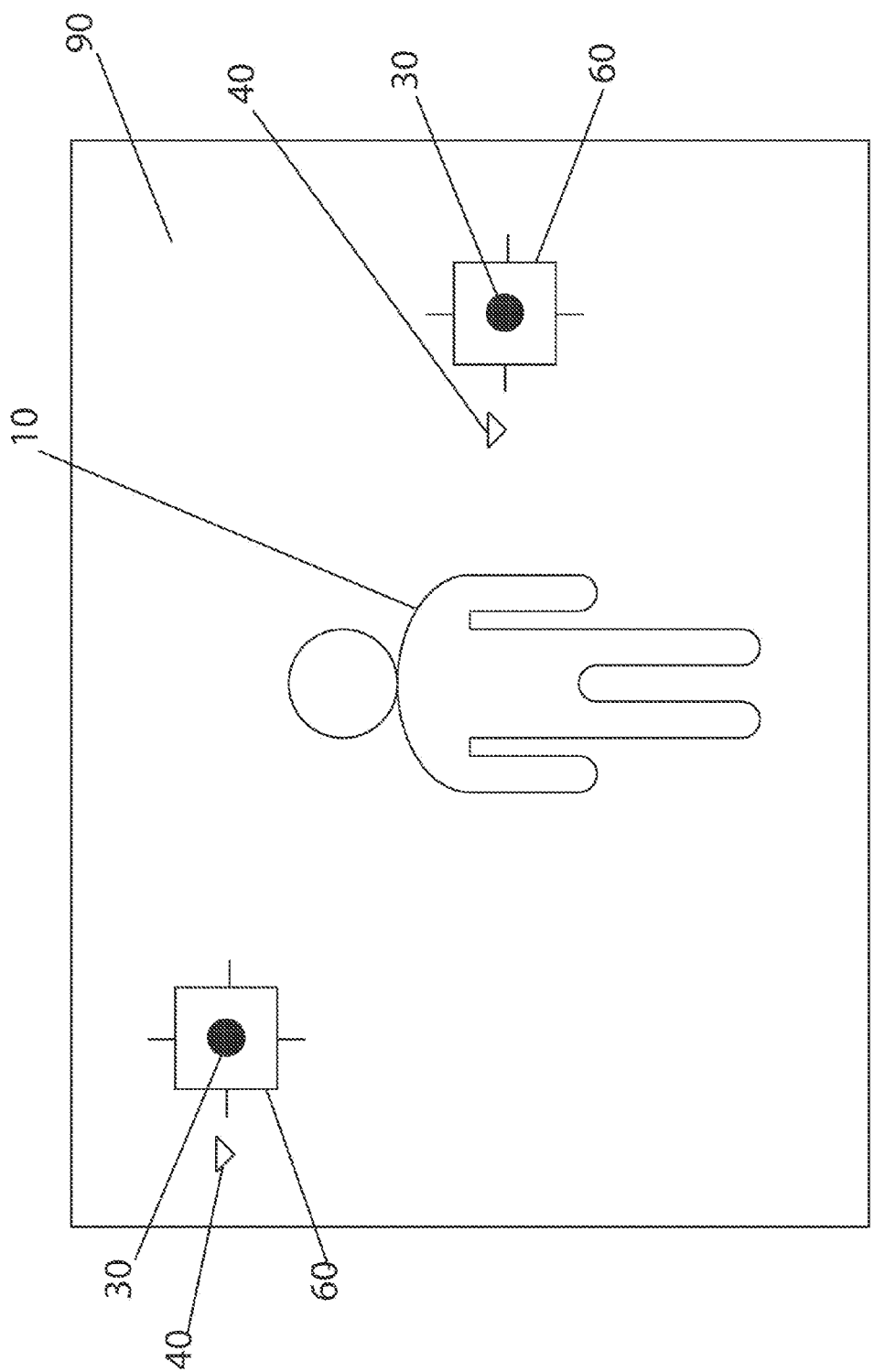
FIG. 2 is a front view of a live action image with a set of points around it representing a rough matte outline in accordance with an embodiment of the present disclosure.

An embodiment of the disclosure is illustrated in FIG. 2. A live action subject 10 is shown in the center of a live action image 90. A virtual marker 40 is displayed along with the live action image 90 in a user interface 400 (FIG. 7). The virtual marker 40 is drawn at the predicted XY position where the corresponding surveyed marker 3D space (from surveying marker 30) would be projected onto the screen.

A 2D tracker 60 is displayed around the live action marker 30. The user selects which marker 30 to track by clicking on it. The live action marker 30 can be a circle, for example. This enables the computer to rapidly detect the center of the circle to subpixel resolution using one of a variety of machine vision transforms that are well known to those skilled in the art. Once the XY positions of the 2D tracker 60 and the corresponding virtual marker 40 are known, the error between the two (which is mostly caused by slight error in camera angle) can be minimized by creating a camera delta angle added to the incoming real-time camera tracking data that minimizes the distance between the live action and the virtual XY positions of the markers.

The 2D tracker 60 follows the position of the motion of marker 30. This can be done by using the incoming data from the newest frame of camera tracking data, adding the delta angle already found for the previous frame, and then calculating the new delta angle to minimize 2D error between the live action and virtual markers. In this way, the error between the two is continually minimized, keeping the solution error small and automatically handling high-speed motion.

The XY position of the virtual marker 40 can be calculated from the measured 3D position of the live action marker 30, and transformed to 2D coordinates using projection techniques that are well known to those skilled in the art, using the live action camera and lens information measured by camera tracking system 120. This produces a basic projected geometry XY position. To more accurately locate the XY position of the virtual marker 40, the system can take into account lens distortion, which can be measured as a lens parameter (see the above-mentioned lens calibration '633 patent) and used to adjust the basic XY projection to the distorted XY projection. This calculation, for example, can be computed by the cvProjectPoints2 function in the OpenCV computer vision library.

In some cases, the incoming live action image must be "deblurred" by performing a reverse blur on the image, using the incoming camera motion data from the sensor. Since the camera motion is known, the amount of motion blur in the live action image can be predicted and removed to increase tracking accuracy. In a preferred embodiment, the deblurring algorithm is a reverse Gaussian algorithm described below, and well known to practitioners in machine vision.

Figure 3:
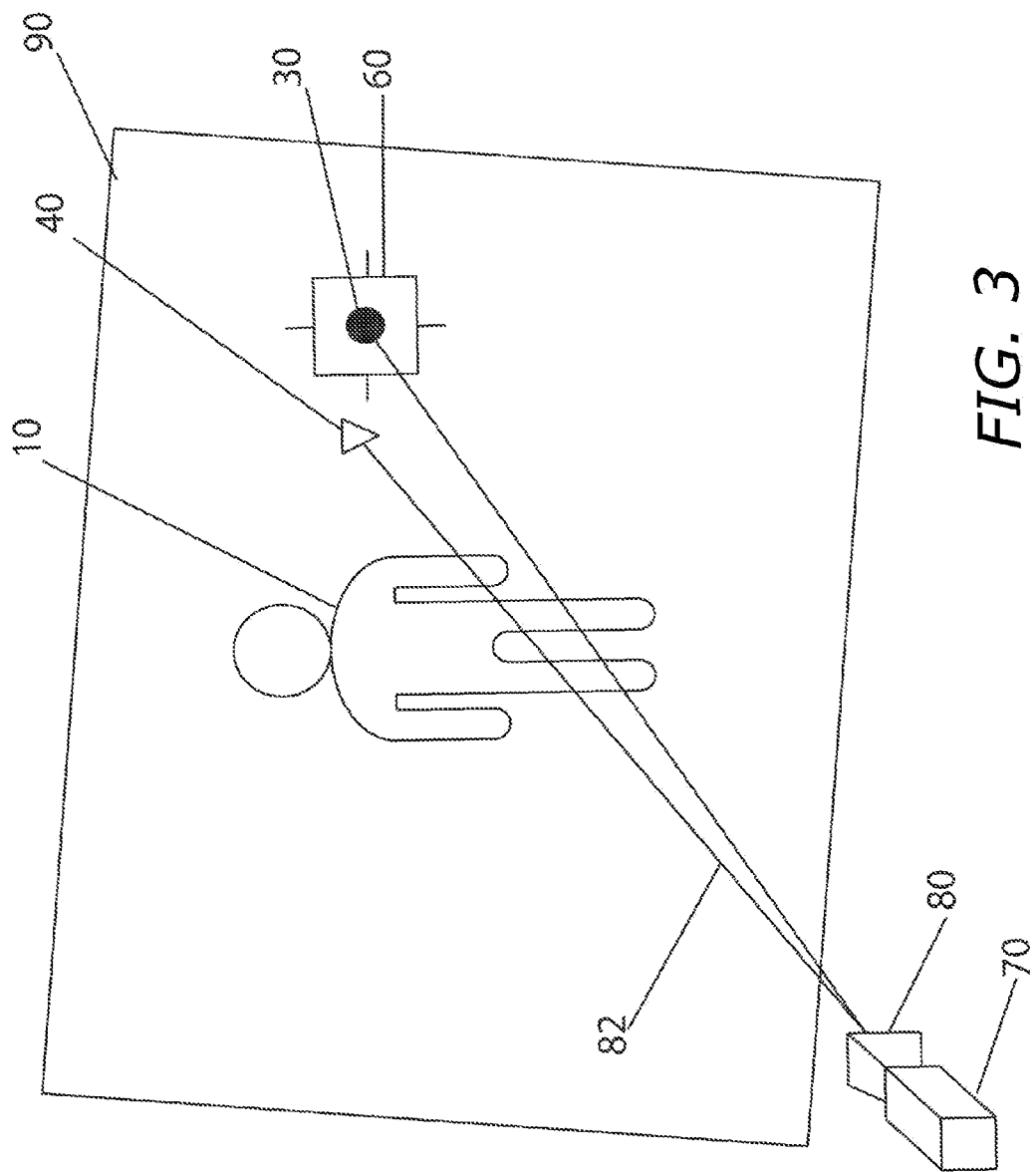
FIG. 3 is a perspective view of a 3D compositing scene in accordance with the present disclosure.

The display in the user interface is 2D and but for correct alignment, all of the various components exist as 3D objects in a virtual scene. Referring to FIG. 3, the transformation of 3D to 2D coordinates can be done using standard projection geometry calculations that are well known to those skilled in the art. A virtual camera 70 has a frustum 80 that describes the field of view of the virtual camera. The parameters of the virtual camera 70 and frustum 80 match the parameters of the live action camera 100 and the lens 110.

A live action image 90 containing a subject 10 is located at a distance from the virtual camera 70. The virtual marker 40 is shown at the point where the system predicts it to be, while the actual marker 30 is located to the right. The 2D tracker 60 follows the live action marker, and the delta angle 82 is calculated between the predicted XY and the actual XY.

Figure 4A:
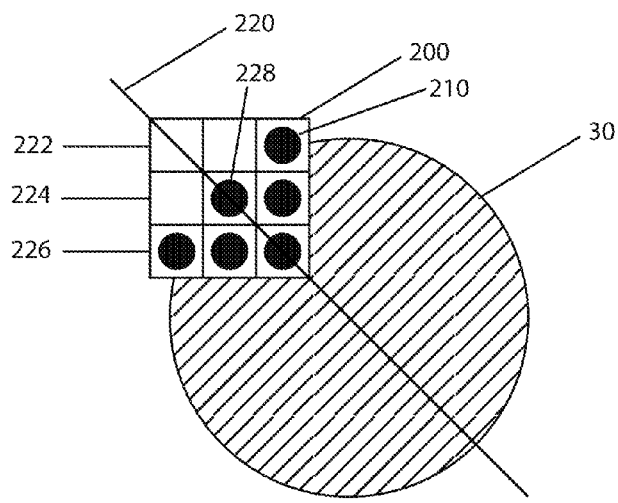
FIGS. 4A, 4B, 4C and 4D are image views of several steps in an edge detection process in accordance with the present disclosure.
Figure 4B:
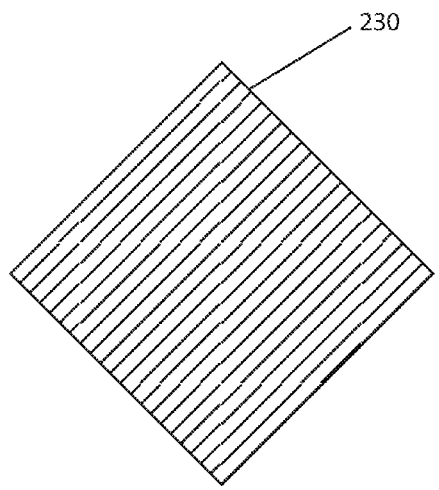
Figure 4C:
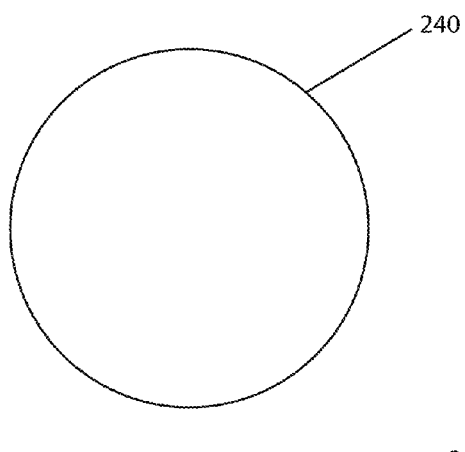
Figure 4D:
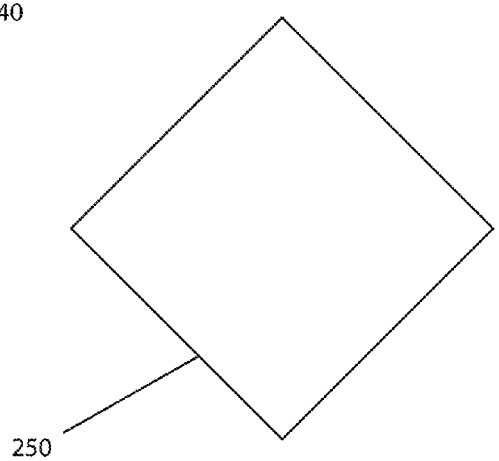

FIGS. 4A-4D represent several stages in the image processing to locate the centers of circular markers 30 within the scene. In FIG. 4A, circular marker 30 is shown with a pixel array 200 consisting of individual pixels. A digital image 90 is made up of millions of these individual picture elements (or pixels) 210. The edge of the circular marker 30 can be seen to cause some of the pixels in array 200 to be dark and some to be light. For reference, a square marker 230 is shown in FIG. 4B to illustrate how the circle detection algorithm will reject square markers 230.

To achieve the speed required by real time operation, each of these operations can take place on a dedicated graphics processing unit, or GPU. While the GPU provides speed, it has a restricted set of programming instructions as compared to a general purpose central processing unit, or CPU.

The next step is to find the slope or derivative 220 of the local image luminance at a center pixel 228, as shown in FIG. 4A. This can be calculated for each pixel in the image 90, based around a center pixel 228 in grid 200. This can be calculated using a dot product operating over a surrounding area of pixels, which is a method well known in the literature. The process of finding the derivative can be calculated, for example, by defining top vector 222, mid vector 224 and bottom vector 226 to correspond to the pixels surrounding the current pixel being processed on the GPU. The slope 220 for this center pixel 228 can then be calculated with:

$$dx=\text{dot}(vec(-1.0, 0.0, 1.0), top) + \text{dot}(vec(-2.0, 0.0, 2.0), mid) + \text{dot}(vec(-1.0, 0.0, 1.0), bot)$$

$$dy=\text{dot}(vec(1.0, 2.0, 1.0), top) + \text{dot}(vec(-1.0, -2.0, -1.0), bot)$$

where dot(x,y) is the dot product of the two vectors specified.

The slope can then be thresholded to find only points with high derivatives (such as the visually sharp edge of marker 30). This generates an image consisting only of pixels with the local derivative at the edges, such as the edges of the circle 240 in FIG. 4C and the square 250 in FIG. 4D. Square 250 is the high derivative image that is extracted from square marker 230 in FIG. 4B.

Figure 5:
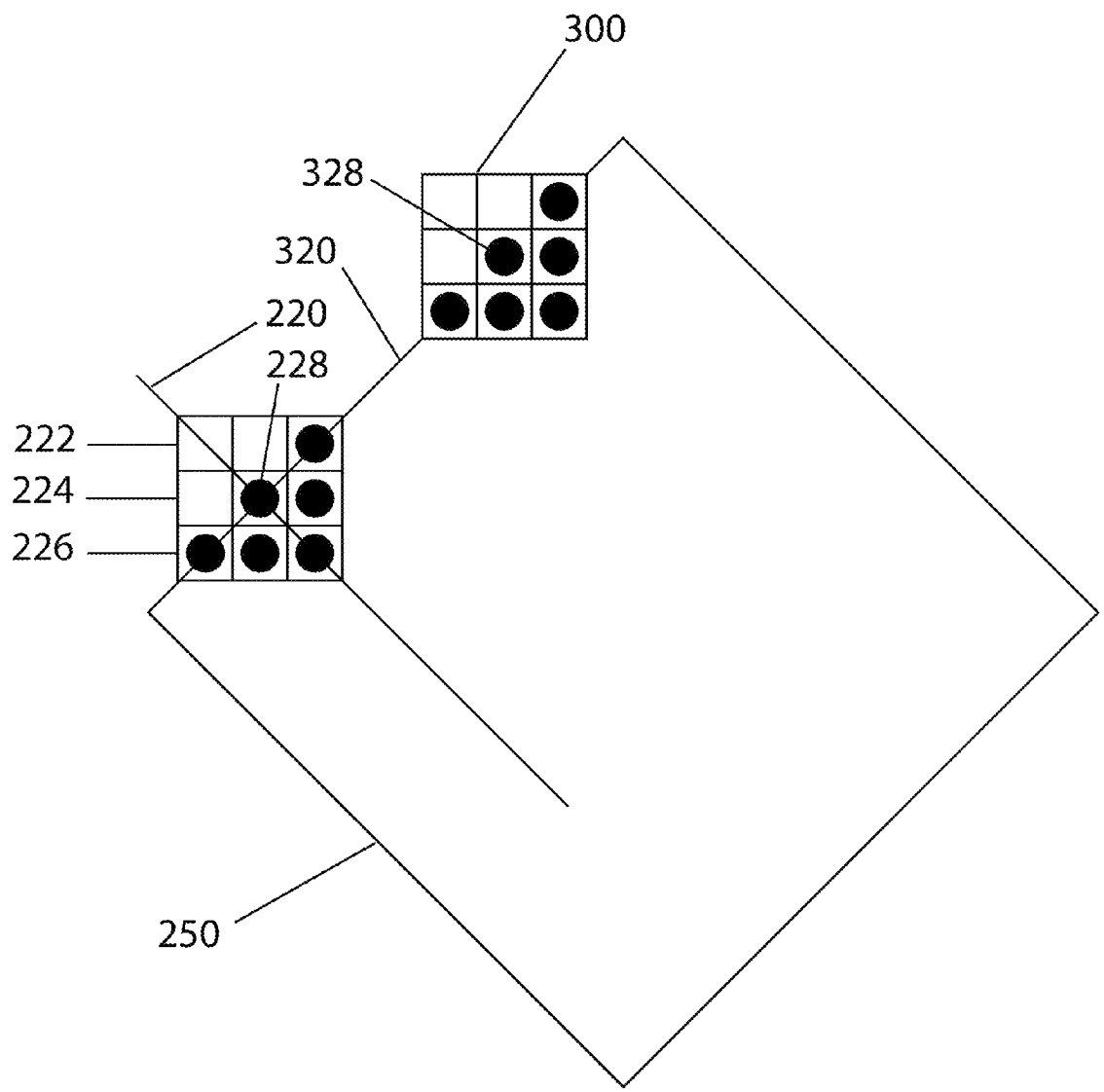
FIG. 5 is an image view of several steps in a parallel line removal process in accordance with the present disclosure.

A further step can then be made to reject parallel lines, such as those generated in square 250. An embodiment is shown in FIG. 5. Derivative image 250 contains a pixel 228 that contains x and y derivative information if it is over a threshold, and 0 if not. For derivatives that are over that threshold (edges), the x and y derivative values comprise the slope of the line that is normal to the local edge. The algorithm then calculates the direction 320 that is perpendicular to the local derivative 220.

The parallel line rejection algorithm then for each pixel 228 searches along the positive and negative directions of the perpendicular 320 to find an offset pixel 328, and compares the derivative found there to the original derivative in pixel 228. If the derivatives are identical, the value of pixel 328 is set to 0. This removes straight edges with constant slopes from consideration in the circle center finding algorithm, and preserves curves such as circle 240. In a preferred embodiment, the search distance can be an adjustable number of pixels, generally less than five. The resulting image can consist only of filtered circles 260 (FIG. 6).

In another embodiment, the system can perform a color difference extraction on the live action image, using techniques well known to practitioners in the art. In this way, the only areas that will be searched for circles are those that are shades of blue or green, enabling the use of darker color green circles on a lighter colored green screen as circular markers. This allows use of markers without interfering with the extraction of the actors from the green or blue screen.

Figure 6:
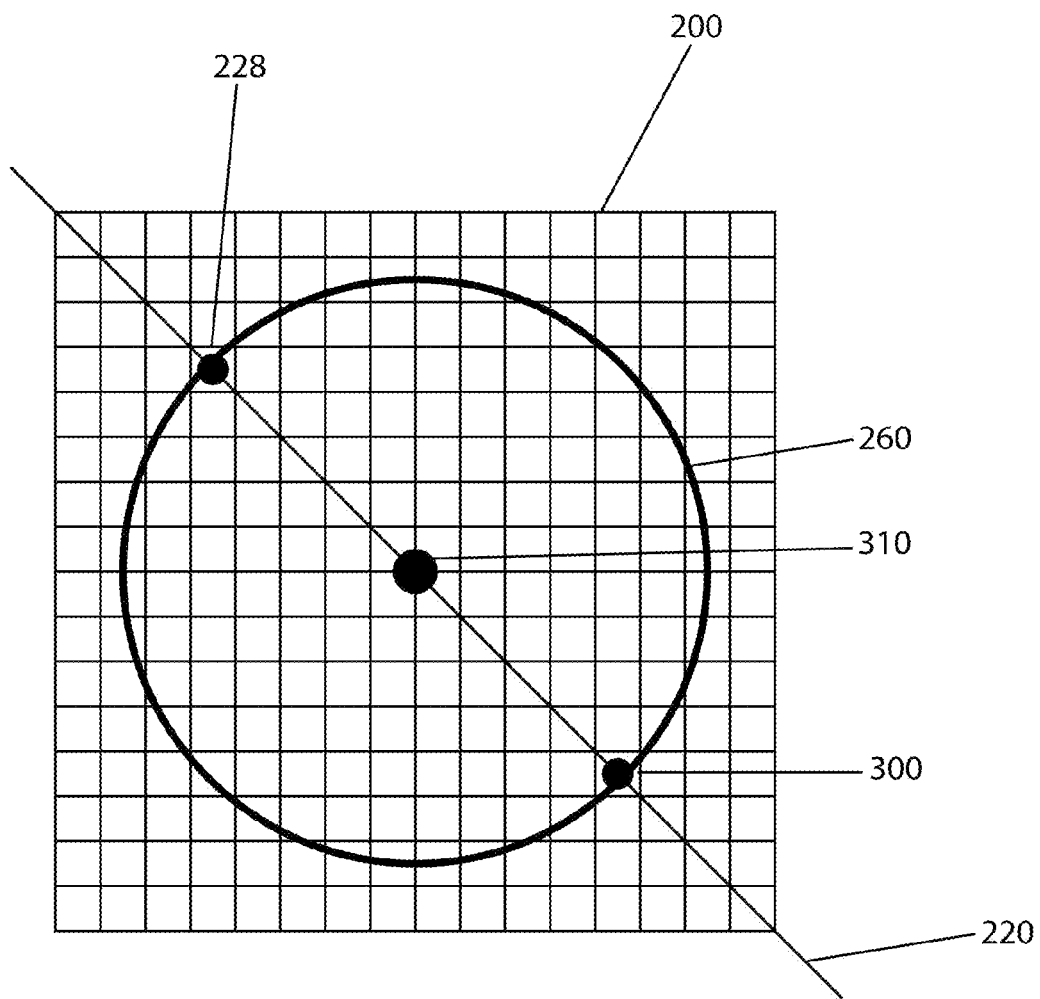
FIG. 6 is an image view of several steps in a circle center detection process in accordance with the present disclosure.

A next step to determine the circle centers is made and an embodiment thereof is shown in FIG. 6. A pixel array 200 consists of the filtered derivative values of filtered circles 260. For each pixel 228 with derivative magnitude values above a user specified threshold, the program searches along the direction of the derivative 220 over a minimum and maximum radius specified by the user. At the maximum derivative value found (the opposite edge of the circle, if it exists), the coordinates of the center of the found circle 310 (calculated by averaging the XY coordinates of the first edge with the second edge) are written into the current pixel value 228. This creates an array of found circle coordinates 462 (FIG. 7).

The "votes" for the circle coordinates are now accumulated. This can be accomplished with a geometry shader, which is a type of graphics processing program well known to those skilled in the arts. The original purpose of the geometry shader is to create a new vertex when programmer specified conditions are met. The geometry shader is written to iterate over the array of found circle coordinates 462. When a pixel with previously written center coordinates is found, the shader emits a vertex to a buffer on the GPU that has been mapped to CPU main memory. In this way, the data transfer between CPU and GPU is limited to a list of XY coordinates of the found circle centers, which is much lower bandwidth (and thus much faster) than reading back a pixel array to the CPU and doing a search for the various coordinates, slopes, etc. in the CPU. Although this would be much easier from a programming standpoint, it would not provide the real time performance that is required for this application.

Once the list of centers is in the CPU, the list can then be tallied up and averaged to find the groupings of found centers. The XY position of the marker center can be predicted, for example, from the camera and lens tracking system's position and orientation, so that each search only takes place centered around one dot. Thus, the average of the found centers for that section is the found center of the circle.

This technique for finding the center of a circle can also be used for high speed alignment and tracking for many types of robotic positioning that need fast accuracy using small graphics processors.

Now, the actual XY positions of the trackers 60 centered around markers 30 are known. Since each tracker 60 has a corresponding predicted XY location 40, the delta angle 82 can be calculated as is shown in FIG. 3. In FIG. 3, the only error is a horizontal error that is corrected by calculating the delta angle 82. The delta angle 82 can be calculated, for example, for the camera pan, tilt, and roll angles by minimizing the sum of the squares of the errors between the predicted XY positions 40 and the actual measured positions 60 of the images of the markers 30.

Since the delta angle 82 is computed for each new frame, image noise can affect the stability of the angle. Delta angle 82 must then be filtered to generate a visually smooth result. This filtering can be achieved, for example, by using a Kalman filter, a method that is well known in the field.

FIG. 7 shows a data flow diagram in a further embodiment. Referring thereto, scene camera 100 generates a live action image 90, which is sent to a target XY predictor 490. Camera tracking system 120 measures the motion of camera 100 and sends camera data 122 to data combiner 420. Lens 110 sends lens position data 112 to lens calibration table 410, which has been previously generated with a lens calibration system such as disclosed in the '663 patent. Using lens position data 112, the lens calibration table 410 can produce lens data 412, which is sent to the data combiner 420. Data combiner 420 sends the combined camera and lens data 310 to target XY predictor 490. Target XY predictor 490 then predicts the XY positions of the live action markers 30 in the live action image 90, and sends an image subset 492 centered around the predicted position of live action marker 30 to the derivative detector 440.

The derivative detector 440 performs a derivative calculation and thresholding operation on image subset 492, which results in derivative image 442. Parallel line remover 450 then removes from the derivative image 442 derivatives that are found to be part of parallel lines, leaving filtered image 452 that consists only of non-parallel edges such as circles. Circle center finder 460 then takes filtered image 452 and searches for the center of the circle predicted by each derivative circle. This results in an image 462 that contains the accumulated circle center predictions. Center voting module 470 accumulates the predicted centers in circle center image 462, and reads out the average predicted center value 472. Since there is typically only one circle found within the predicted search area, this prediction is the center average of live action marker 30.

In user interface 400, the user enters the data for the surveyed live action marker 3D locations 32. This is sent to a point projection module 430. Using the combined data 310 from the data combiner 420, the point projection module 430 generates a set of predicted 2D virtual marker positions 40, each of which corresponds to an actual circle center average 472. These two data streams are sent to an XY error minimizer 480, which calculates the adjusted pose 482 that provides the minimum error between the predicted and actual circle centers. To remove noise in the solution, the adjusted pose 482 is sent to noise filter 500, which performs a noise reduction calculation on adjusted pose 482 to produce filtered pose 502, which can be the final output.

Figure 8:
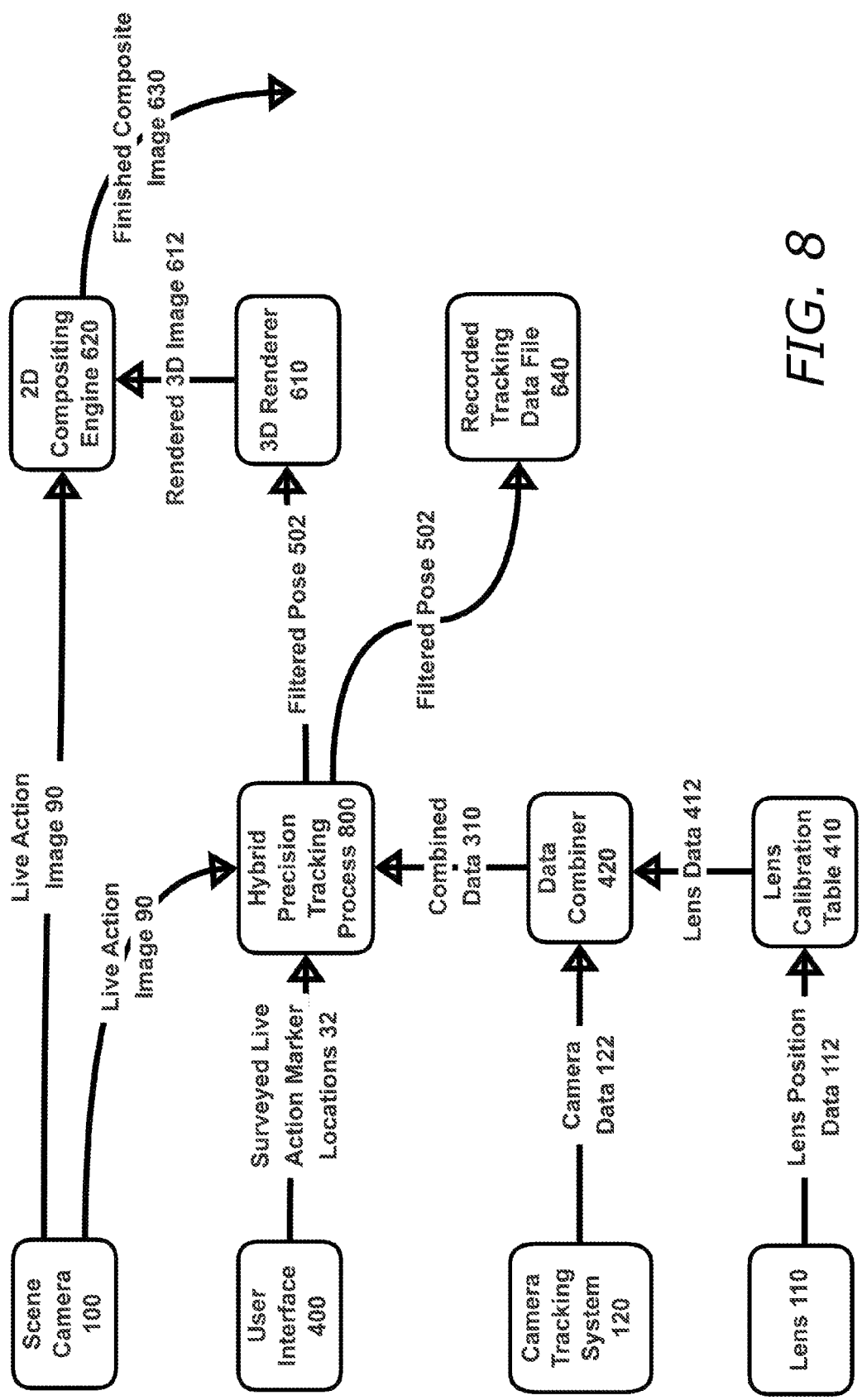
FIG. 8 is a data flow diagram showing an exemplary existing virtual studio system modified to include a hybrid precision tracking process of the present disclosure.

FIG. 8 is a data flow diagram showing an existing virtual studio system, such as the PREVIZION system, modified to include a hybrid precision tracking process (shown in the middle of the drawing by box 800) of the present disclosure, and as discussed above. The PREVIZION system includes a camera tracking system 120, a lens calibration table 410 that interprets lens position data 112 from lens 110, a data combiner 420 to bring the camera data 122 and lens data 412 data together, a 2D compositing engine 620 and a 3D renderer 610. The system reads camera data 122 and lens position data 112 along with live action image 90, creates a rendered 3D virtual image 612, and combines this with the live action image 90 in the 2D compositing engine 620 to create a finished composite image 630.

Previously, the 3D camera pose data went directly from the data combiner 420 to the 3D renderer. In contrast a system herein (and as depicted in FIG. 8, for example) can use the predicted camera location from the data combiner 420 along with the 3D locations of the surveyed tracking markers, and calculate a new filtered pose 502. Filtered pose 502 can then be sent to a 3D renderer 610 to generate the correctly aligned rendered 3D image 612, which is then composited with live action image 90 in a 2D compositing engine 620 to generate a finished composite image 630 with the virtual set extension correctly aligned to the live action set.

PREVIZION is a real-time visual effects system that provides high precision camera tracking, sophisticated rendering and VFX quality keying, which makes it ideal for the real time compositing of virtual backgrounds and CGI characters for on-set production. The PREVIZION system provides filmmakers with the freedom to create visual effects shots with dynamic camera moves and actually see the completed effects while shooting green screen or virtual elements. This ability enables producers to use high quality visual effects with a minimal increase in production costs and significant savings in post production.

Referring again to FIG. 7, two major areas of the present disclosure are shown. The first area depicted by dotted line block 600 can include elements 490, 420 and 410. It relates to the use of a calibrated look-up table to adaptively modify the search locations for scene markers when using adjustable lenses, such as those used in motion picture production.

The second area depicted by dotted line block 700 can include elements 440, 450, 460 and 470. The second area 700 relates to the use of a high speed, GPU based circle center detection scheme using a fast circle geometry based search. This keeps the operation on the GPU except for the final readback of circle centers in the voting process, and provides a speed increase over other traditional circle center finding algorithms such as the Hough transform.

Another novel area/aspect of this disclosure is the use of arbitrary camera tracking data 122 coming in from camera tracking system 120. An embodiment of the present system can work with arbitrary external tracking sources, such as encoders, GPS and so forth.

A flow chart of a software process of the present disclosure can be essentially that of the video processing system 130 in FIG. 7.

As mentioned above the current camera motion data from the camera tracking system can be used to generate a "deblurred" image of the marker. This can be important in order to handle tracking with any degree of camera motion.

The main steps in this "deblurring" process can include:
For each pixel, using the present and previous camera position and orientation, calculate the 2D motion vector.
Take several pixel samples along the 2D motion vector, starting with the present XY position.
Add a cumulative total of the color samples to one buffer, sumColor.
Add a cumulative total of the differences between the original pixel color and the sampled colors.
Divide the color sample total by the number of samples to get an average.
Subtract the averaged color from the current pixel to get a buffer with the removed color values.
Generate the final unblurred image by linearly interpolating between the original color image and the removed average, using the color difference buffer as the weighting factor.

This can work out to the following code:

```
vec2 sCoord = coord;
vec3 sumColor = vec3(0.0, 0.0, 0.0)
float diff = 0.0;
for(int iSample = 0; iSample < samples; iSample++)
{
    sCoord += coordInc;
    vec3 sColor = texture(image, sCoord).rgb;
    sumColor += sColor;
    diff += abs(dot(vec3(1.0, 1.0, 1.0), (sColor − color)));
}
sumColor /= float(numSamples);
float sumMult = 0.5;
float mult = (1.0/(1.0 − sumMult));
vec3 removed = mult * (color − (sumMult * sumColor));
diff* = scale;
diff = min(diff, 1.0);
vec3 unblurred = mix(color, removed, diff);
```

Examples of ways/methods in which the present disclosures can be used, commercialized and/or built can include: as a feature as part of Lightcraft Technology LLC's existing virtual studio (PREVIZION) system; as an add-on software or hardware component for other existing virtual studio systems such as ORAD, Viz-RT, and Brainstorm; as an embedded program running inside a digital motion picture camera; and as a software addition to a post production tool. The additional hardware component can be a small box with a HDSDI video input for the incoming signal, serial or network inputs for the incoming tracking and lens data, and a serial or network output for the refined tracking data. The user can optionally turn on a menu overlay to adjust the system parameters. The add-on software can be transmitted over the Internet, on a disk, USB drive, etc. The software can be in the form of a (non-transitory) (tangible) computer-readable medium (e.g., a disk, hard drive, or other data storage device) containing program instructions for causing a computer to perform a particular process, as disclosed herein.

That is, the present disclosure can be used as a software addition to a post-production tool. For this tool, the software code herein can be easily ported over. That is, since the code already works in real time, those skilled in the art would know from this disclosure how to make it work in non-real time.

The above-mentioned add-in software can be compiled directly into the PREVIZION product, and so can be transmitted to the user by sending him a new build with the feature enabled. In a separate hardware form, it can be sent to a user as a separate box.

Adapting the present disclosure in a real-time virtual studio system, aside from that of the PREVIZION system, can be done, for example, by making a hardware box that contains most of the code and hardware used for the PREVIZION system minus the 3D rendering code. (The video hardware I/O, serial connections to the external camera and lens tracking devices, and a GPU on which to run the high speed marker detection functions are still used.)

In a preferred embodiment, the video hardware I/O card can be a MerlinIP HDSDI card from Skymicro Inc. of Simi Valley, Calif. The serial connections can be through a standard serial interface card known to computer technology practitioners. The GPU can be a nVidia Quadro type GPU. The main computer can be a standard graphics workstation type machine, the specifics of which are well known to practitioners of computer graphics.

Although the inventions disclosed herein have been described in terms of preferred embodiments, numerous modifications and/or additions to the above-described embodiments would be readily apparent to one skilled in the art. The embodiments can be defined, for example, as methods carried out by any one, any subset of or all of the components as a system of one or more components in a certain structural and/or functional relationship; as methods of making, installing and assembling; as methods of using; as methods of commercializing; as kits of the different components; as an entire assembled workable system; and/or as subassemblies or sub-methods. It is intended that the scope of the present inventions extend to all such modifications and/or additions.

What is claimed is:

1. A hybrid through-the-lens tracking method, comprising:
    reading current incoming camera position, orientation, and adjustable field-of-view/zooming and focusing lens information of an actual scene camera, wherein the lens information includes lens position information;
    deriving current lens parameters of the actual scene camera using the lens position information;
    predicting the 2D locations of actual markers in a live action scene using (a) the current lens parameters, (b) the current incoming camera position and orientation information and (c) the lens position information;
    detecting the 2D locations of the actual markers in the live action scene;
    the detecting including derivative detecting to find sharp edges of the actual markers, center detecting to find possible centers of circles, and center voting to detect actual centers of the circles;
    calculating angular corrections for a virtual camera from the current incoming camera position and orientation information, the predicted 2D locations, and the detected 2D locations; and
    using the angular corrections, correcting the orientation of the current incoming camera orientation information of the actual scene camera to match the 2D locations of the actual markers.

2. The method of claim 1 wherein the detecting further includes:
    before the derivative detecting, deblurring the live action image of the actual markers to get a sharp circle; and
    before the center detecting, removing parallel lines from the edge detection results to remove things that are not circles.

3. The method of claim 2 further comprising using the detected actual centers, the incoming camera position and orientation information, and the predicted 2D positions to calculate the angular correction needed to make the predicted 2D marker positions match the actual 2D marker positions.

4. The method of claim 1 further comprising using the detected actual centers to calculate the angular correction needed to make the predicted 2D positions using the measured camera angles match the actual marker positions in the live action scenes, by using the incoming camera position as the base point of the angle.

5. The method of claim 1 wherein the deriving includes using a look-up table that correlates lens position information with optical parameters of the lens of the actual scene camera.

6. The method of claim 1 wherein the lens position information is lens barrel rotation measurement information of the actual scene camera.

7. The method of claim 1 wherein the current incoming camera position, orientation, and adjustable field-of-view/zooming and focusing lens information is real time information, and the lens position information is on a per frame basis.

8. The method of claim 1 further comprising 3D rendering a 2D virtual image produced by the virtual camera to produce a 2D composited image.

9. The method of claim 8 wherein the 3D rendering is after the correcting the orientation.

10. The method of claim 1 further comprising after the correcting, filtering the angular corrections to reduce motion noise and improve tracking accuracy.

11. The method of claim 10 further comprising after the filtering, correcting the pose of the virtual camera using the filtered angular corrections.

12. The method of claim 1 wherein the angular corrections are for the pan, tilt and roll angles of the virtual camera.

13. The method of claim 1 wherein the predicting uses 3D locations of the actual markers in the live action scene.

14. The method of claim 1 wherein the focusing lens information includes lens distortion information, and further comprising rendering the virtual background with correct distortion to thereby match the live action image of the actual markers using the lens distortion information.

15. The method of claim 1 wherein the focusing lens information includes the current measured camera position and orientation, and the current lens parameters include focal length, distortion, and entry pupil location.

16. The method of claim 1 wherein the actual markers are circular markers.

17. The method of claim 1 wherein the actual markers are fiducial markers, bar code markers or natural feature markers.

18. A hybrid through-the-lens tracking method, comprising:
    reading current incoming camera position, orientation, and adjustable field-of-view/zooming and focusing lens information of an actual scene camera, wherein the lens information includes lens position information;
    the current incoming camera position, orientation, and adjustable field-of-view/zooming and focusing lens information being real time information;
    the lens position information being on a per frame basis;
    deriving current lens parameters of the actual scene camera using the lens position information;
    the deriving including using a look-up table that correlates lens position information with optical parameters of the lens of the actual scene camera;
    predicting the 2D locations of actual markers in a live action scene using (a) the current lens parameters, (b) the current incoming camera position and orientation information and (c) the lens position information;

detecting the 2D locations of the actual markers in the live action scene;

calculating angular corrections for a virtual camera from the current incoming camera position and orientation information, the predicted 2D locations and the detected 2D locations; and using the angular corrections, correcting the orientation of the current incoming camera orientation information of the actual scene camera to match the 2D locations of the actual markers.

19. The method of claim 18 wherein the lens position information is lens barrel rotation measurement information of the actual scene camera.

20. The method of claim 18 further comprising 3D rendering a 2D virtual image produced by the virtual camera to produce a 2D composited image.

21. The method of claim 20 wherein the 3D rendering is after the correcting the orientation.

22. The method of claim 18 further comprising after the correcting, filtering the angular corrections to reduce motion noise and improve tracking accuracy.

23. The method of claim 22 further comprising after the filtering, correcting the pose of the virtual camera using the filtered angular corrections.

24. The method of claim 18 wherein the detecting includes:
deblurring the live action image of the actual markers to get a sharp circle;
derivative detecting to find sharp edges of the actual markers;
removing parallel lines from the edge detection results to remove things that are not circles;
center detecting to find possible centers of circles; and
center voting to detect actual centers of the circles.

25. The method of claim 24 further comprising using the detected actual centers to calculate the angular correction needed to make the predicted 2D positions using the measured camera angles match the actual marker positions in the live action scenes.

26. The method of claim 18 wherein the angular corrections are for the pan, tilt and roll angles of the virtual camera.

27. The method of claim 18 wherein the predicting uses 3D locations of the actual markers in the live action scene.

28. The method of claim 18 wherein the focusing lens information includes lens distortion information, and further comprising rendering the virtual background with correct distortion to thereby match the live action image of the actual markers using the lens distortion information.

29. The method of claim 18 wherein the focusing lens information includes the current measured camera position and orientation, and the current lens parameters include focal length, distortion, and entry pupil location.

30. The method of claim 18 wherein the actual markers are circular markers.

31. The method of claim 18 wherein the actual markers are fiducial markers, bar code markers or natural feature markers.

* * * * *